United States Patent [19]

Hamilton

[11] 4,144,945
[45] Mar. 20, 1979

[54] MOTORIZED GARDEN PLOW OR CULTIVATOR

[75] Inventor: Archie I. Hamilton, Atlanta, Ga.

[73] Assignee: Hamilton Bros. Mfg. Co., Atlanta, Ga.

[21] Appl. No.: 856,727

[22] Filed: Dec. 2, 1977

[51] Int. Cl.² ............................................. B62D 51/06
[52] U.S. Cl. ................... 180/19 R; 172/256; 172/258
[58] Field of Search ............. 180/19 R; 172/258, 259, 172/356, 42, 43, 256

[56] References Cited

U.S. PATENT DOCUMENTS

| 1,345,109 | 6/1920 | Seeley ................................. 180/20 |
| 1,550,291 | 8/1925 | Stull et al. ........................ 172/258 X |
| 2,477,945 | 8/1949 | Simpkins ........................... 180/19 R |
| 2,583,846 | 1/1952 | Hull .................................... 180/19 R |
| 3,360,065 | 12/1967 | Wyman ............................. 180/19 R |
| 3,774,692 | 11/1973 | McDaniel .......................... 172/258 |

FOREIGN PATENT DOCUMENTS

| 162798 | 9/1948 | Austria ..................................... 172/259 |
| A66068 | 5/1956 | France .................................. 180/19 R |
| 250824 | 9/1947 | Switzerland ......................... 180/19 R |

*Primary Examiner*—John A. Pekar
*Attorney, Agent, or Firm*—Newton, Hopkins & Ormsby

[57] ABSTRACT

A hand guided power driven garden plow features a low profile double width tire to provide traction in sandy or soft terrain and a free-wheeling connection in the power drive chain to allow easy rolling of the plow without engine power. Another major feature is the provision of a solid steel sub-structure incorporated in the framework of the machine for greater weight and better balance and traction and for economy in commercial production of the machine. Another embodiment utilizes a dual traction wheel in lieu of the single double width tire or wheel.

5 Claims, 4 Drawing Figures

MOTORIZED GARDEN PLOW OR CULTIVATOR

BACKGROUND OF THE INVENTION

Powered hand guided garden cultivators are well known in the art and some examples of the patented prior art are shown in the following U.S. patents: Nos.
2,368,290
2,477,945
2,583,846
3,647,005
3,680,640.

Certain problems exist in the prior art which have somewhat hindered the acceptance of power-operated garden cultivators and limited their utility. One common defect in the prior art has been lack of adequate strength in the supporting frame of the machine tending to reduce the durability and useful life of the cultivator. Another deficiency has been lack of massiveness resulting in poor traction and poor balance in the cultivator rendering it somewhat difficult to handle. Still another common problem or deficiency has been the general lack of a free-wheeling device in the power train whereby the operator at any time and without the need for utilizing special controls may simply override the power train and roll the cultivator forwardly without engine power.

Accordingly, the object of the invention is to completely satisfy the needs of the art in terms of overcoming the above deficiencies and thereby greatly increasing the utility, durability, life span, and convenience of operation of a motorized garden plow or cultivator.

A further object is to provide in a motorized hand guided cultivator an improved, sturdier and more massive substructure which renders the machine easier and more economical to manufacture, much stronger and imparts to the machine a better balance and a better overall "feel" during its operation.

Other features and advantages of the invention will become apparent during the course of the following description.

DETAILED DESCRIPTION

Figure 2:
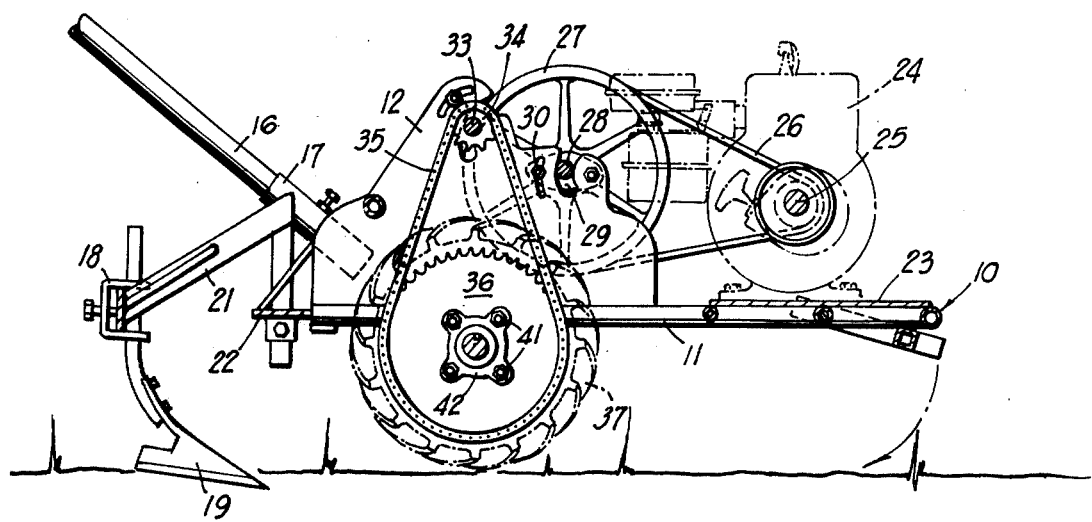
FIG. 2 is a fragmentary longitudinal vertical section through the cultivator.
Figure 3:
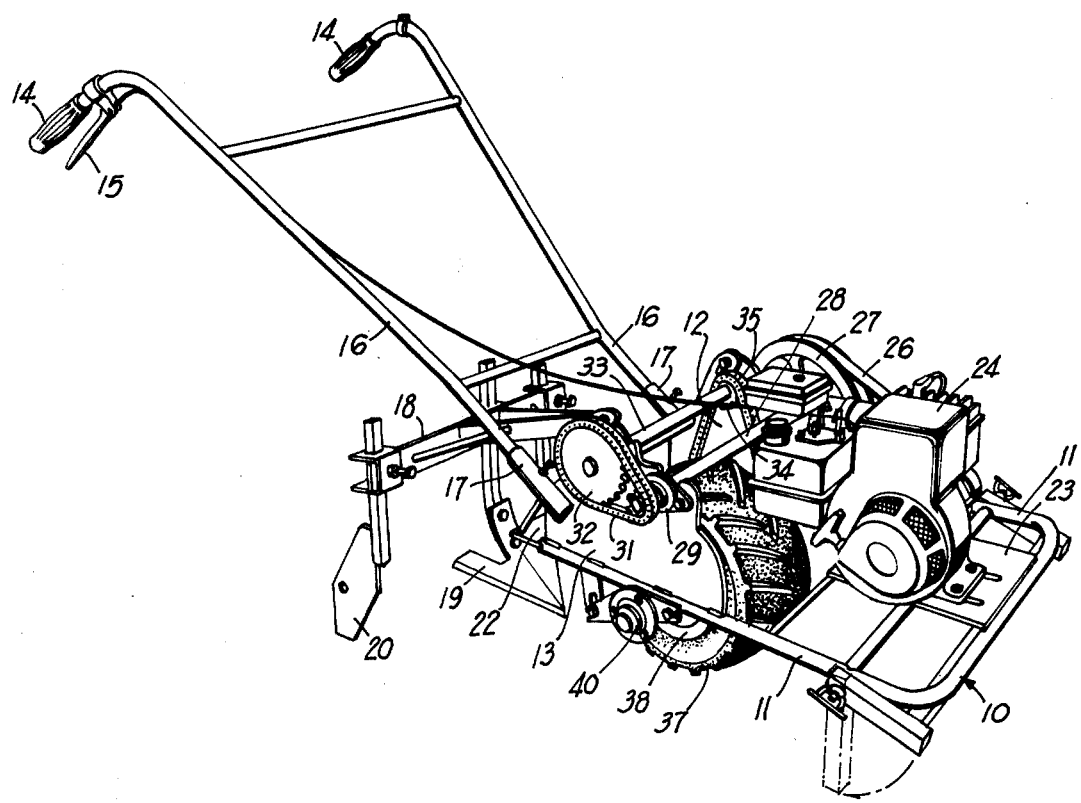
FIG. 3 is a perspective view, similar to FIG. 1, showing a modified embodiment.
Figure 4:
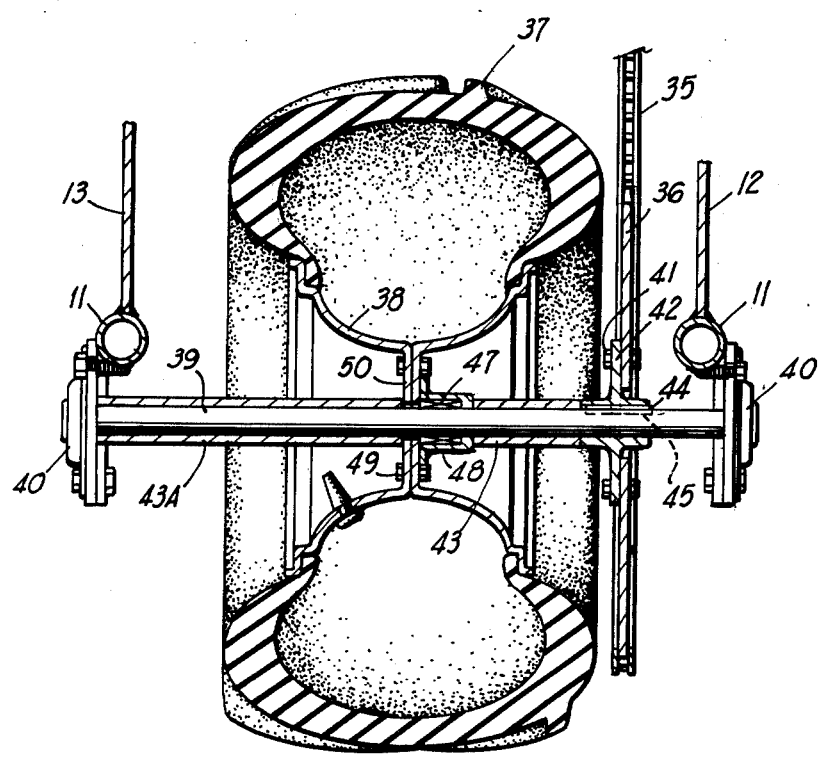
FIG. 4 is an enlarged fragmentary transverse vertical section through the single wide traction wheel of the embodiment in FIG. 3 and showing a free-wheeling device common to both embodiments.

Referring to the drawings in detail wherein like numerals designate like parts, and referring initially to FIGS. 2, 3 and 4, a motorized hand guided garden plow or cultivator is shown having a horizontal U-frame 10 including spaced parallel longitudinal frame bars 11. Rigidly secured to the rearward portions of the two bars 11 as by welding and rising therefrom vertically in spaced parallel relationship are comparatively heavy preferably solid steel sub-structure plates 12 and 13 which add massiveness to the machine, improve its balance during use, and render it more practical and economical to manufacture. The plates 12 and 13 also considerably increase the structural strength of the machine frame. Preferably, the plates 12 and 13 extend for at least one-half the length of the U-frame 10 from the rear end of the frame forwardly, as best shown in FIG. 2.

The customary rearwardly extending inclined guidance handles 14 with conventional manual controls 15 have their support arms 16 secured fixedly in sleeves or sockets 17 rigidly attached to the sub-structure plates 12 and 13 by welding, bolting or the like. A suitable tool bar 18 for supporting a variety of interchangeable plow points 19 and 20, or like cultivating implements, is also suitably tied into the frame of the machine, as by a tool bar support arm 21 horizontal platform extension 22 at the rear end of the U-frame 10.

At its forward end portion, the frame 10 carries a horizontal platform 23 which supports an engine 24, whose crank shaft 25 drives a primary belt 26, in turn driving a large diameter pulley 27 on a transverse shaft 28 held within suitable bearings 29 attached as at 30, FIG. 2, to the plates 12 and 13. The means 30 allows the transverse horizontal shaft 28 to be adjusted on the vertical plates 12 and 13, as illustrated.

The shaft 28 carries a sprocket gear outwardly of vertical plate 13 driving a chain 31, in turn driving a larger sprocket gear 32 on another transverse shaft 33 above and rearwardly of the shaft 28, FIG. 2. The shaft 33 carries a sprocket gear 34 at its far end, driving a descending chain 35 in turn driving a large sprocket gear 36.

In the embodiment of FIGS. 2, 3 and 4, the invention utilizes a single very wide low profile pneumatic tire 37 on its traction wheel 38, the width of the tire 37 approximating the combined widths of two side-by-side conventional garden cultivator tires. The tire 37 assures adequate traction in soft or sandy terrain and operates satisfactorily on all types of terrain, making the cultivator easy to balance.

Referring to FIG. 4, the transverse axle 39 for the traction wheel 38 is held in a pair of bearings 40 rigidly connected to and depending from the two frame bars 11. The sprocket gear 36 is attached at 41 to a sprocket hub 42, rigidly secured by a key 44 to a keyway 45 in the axle or shaft 39. Therefore, the sprocket gear 36 positively drives the axle 39 which is keyed thereto. The axle 39 is engaged and received by a conventional one-way active and one-way free-wheeling clutch unit 47 housed by wheel hub 48 at bolts 49 to the web structure 50 of traction wheel 38. To position the wheel 38 on axle shaft 39, a section of pipe or like tubular material 43 is telescopically received by the axle 39 between sprocket hub 42 and wheel hub 48 and accordingly, on the opposite side of the wheel, a spacer 43A is employed around axle 39 to fix the lateral position of wheel 38 on axle 39. The arrangement is such that rotation of the axle 39 in one direction under influence of the sprocket gear 36 and key shaft 39 to drive the cultivator forwardly is transmitted through the one-way active clutch unit 47 to the traction wheel 38 to drive it. However, the clutch unit 47 is free-wheeling in the opposite direction, and therefore at all times the operator of the cultivator can always push it forwardly with freedom regardless of whether the engine power train is active or de-clutched by conventional controls. Any conventional form of free-wheeling device may be employed between the driven axle 39 and traction wheel 38 so that the wheel will be positively driven by the engine and power train while allowing the user of the machine to push it freely forwardly at any time.

Figure 1:
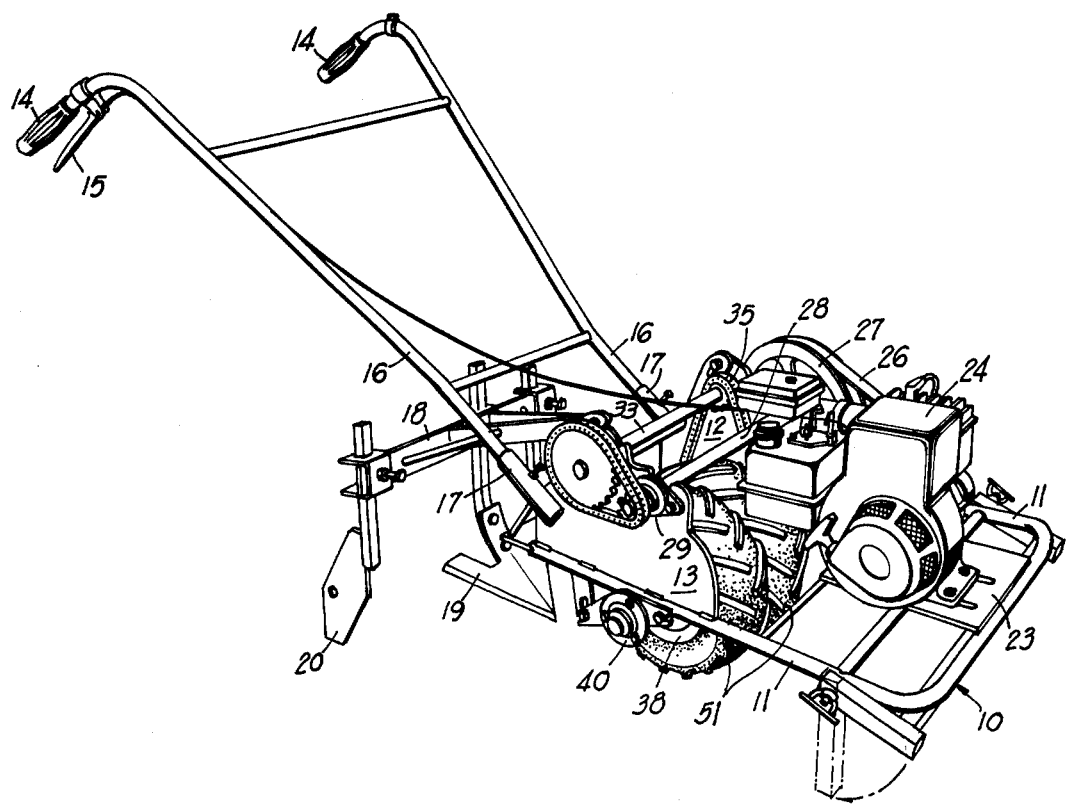
FIG. 1 is a perspective view of a motorized hand guided cultivator or plow according to one embodiment of the invention.

The modified embodiment in FIG. 1 is identical in all respects to the described embodiment in FIGS. 2 to 4 except that in lieu of the single double width tire 37 on traction wheel 38, a dual wheel arrangement is employed on the axle 39 including dual standard width tires 51. The same free-wheeling or clutch unit 47 is utilized in FIG. 1.

The advantages of the invention over the known prior art as discussed previously are all achieved in the construction of the machine as described in detail above and these advantages should be readily recognized by those skilled in the art.

It is to be understood that the forms of the invention herewith shown and described is to be taken as a a preferred example of the same, and that various changes in the shape, size and arrangement of parts may be resorted to, without departing from the spirit of the invention or scope of the subjoined claims.

I claim:

1. A motorized garden cultivator comprising a horizontal U-shaped frame member having rearwardly extending arms, vertical plates rigidly connected to and extending upwardly from the rear portions of said arms for increasing the structural strength of said cultivator frame member, guidance handles extending upwardly and rearwardly from said plates, cultivating tool bar means supported on the rear portions of said arms, a horizontal plate mounted on the forward portion of said U-shaped frame member, an engine mounted on said horizontal plate, bearings rigidly connected to and depending from opposite portions of the arms of said frame member, a shaft rotatably mounted in said bearings, a wheel having a hub portion mounted on said shaft, said wheel extending across more than half the distance between the arms of the frame member, a free wheeling device located within said hub portion and coupled between said wheel and shaft, and a driving connection between said engine and said shaft.

2. A motorized garden cultivator as in claim 1 wherein said shaft is enclosed in a sleeve which abuts one side of the hub portion at one of its ends and which abuts one of said bearings at its other end whereby said hub is maintained at a fixed distance from said bearing.

3. A motorized garden cultivator as in claim 2 wherein the driving connection between the engine and shaft includes a gear wheel mounted on the shaft on the side of the hub opposite said sleeve and wherein the portion of the shaft between the gear wheel and the hub is surrounded by a sleeve spacing the gear wheel and the hub.

4. A motorized garden cultivator as in claim 3 wherein said free wheeling device comprises a clutch unit enclosed in a housing attached to said hub.

5. A motorized garden cultivator as in claim 1 wherein said wheel includes dual side-by-side pneumatic tires for increasing the traction thereof.

* * * * *